United States Patent [19]

Moriwaki et al.

[11] Patent Number: 5,226,144
[45] Date of Patent: Jul. 6, 1993

[54] CACHE CONTROLLER FOR MAINTAINING CACHE COHERENCY IN A MULTIPROCESSOR SYSTEM INCLUDING MULTIPLE DATA COHERENCY PROCEDURES

[75] Inventors: Atsushi Moriwaki; Shigenori Shimizu, both of Kawasaki, Japan

[73] Assignee: International Business Machines Corporation, Armonk, N.Y.

[21] Appl. No.: 463,687

[22] Filed: Jan. 11, 1990

[30] Foreign Application Priority Data

Jan. 13, 1989 [JP] Japan .................................. 64-4799

[51] Int. Cl.⁵ ............................................. G06F 12/00
[52] U.S. Cl. ............................. 395/425; 364/DIG. 1; 364/243.41; 364/243.44; 364/931.4
[58] Field of Search ... 364/200 MS File, 900 MS File; 395/425, 400

[56] References Cited

U.S. PATENT DOCUMENTS

| | | | |
|---|---|---|---|
| 4,493,026 | 1/1985 | Olnowich | 364/200 |
| 4,494,190 | 1/1985 | Peters | 395/575 |
| 4,639,860 | 1/1987 | Peters | 395/325 |
| 4,669,043 | 5/1987 | Kaplinsky | 395/400 |
| 4,719,568 | 1/1988 | Carrubba et al. | 364/200 |
| 4,928,225 | 5/1990 | McCarthy et al. | 364/200 |
| 4,933,835 | 6/1990 | Sachs et al. | 395/425 |
| 4,959,777 | 9/1990 | Holman, Jr. | 364/200 |
| 5,008,813 | 4/1991 | Crane et al. | 364/200 |
| 5,025,365 | 6/1991 | Mathur et al. | 364/200 |
| 5,029,070 | 7/1991 | McCarthy et al. | 395/425 |
| 5,043,886 | 8/1991 | Witek et al. | 364/200 |
| 5,113,514 | 5/1992 | Albonesi et al. | 395/425 |

FOREIGN PATENT DOCUMENTS

| | | |
|---|---|---|
| 51-139736 | 5/1975 | Japan . |
| 50-73530 | 6/1975 | Japan . |
| 50-156857 | 12/1975 | Japan . |
| 51-32241 | 3/1976 | Japan . |
| 50-65141 | 6/1976 | Japan . |
| 5365025 | 11/1976 | Japan . |

OTHER PUBLICATIONS

"Shared Memory Systems on The Futurebus", P. Sweazey, Compcon Spring 88, San Francisco, 29th Feb.-4th Mar. 1988, Conf. 33, pp. 505-511, IEEE, New York.

"Caching on Futurebus", Electronic Engineering, vol. 60, No. 739, Jul. 1988, pp. 31, 33, 34, 36, Woolwich, London, GB.

"The NS32605 Cache Controller", L. K. Quinones, Compcon Spring 88, San Francisco, 29th Feb.-4th Mar. 1988, conf. 33, pp. 218-222, IEEE, New York.

Primary Examiner—Joseph L. Dixon
Assistant Examiner—Frank J. Asta
Attorney, Agent, or Firm—Thomas E. Tyson; Paul S. Drake

[57] ABSTRACT

A data processing system that includes a plurality of processors with at least a portion of this plurality of processors each individually connected to a cache memory for storing data for that processor. Each cache memory includes a cache controller that is connected to a bus. Each controller includes a circuit for independently storing a data coherency procedure indicator indicating that the controller will perform one of two or more data coherency procedures. According to one procedure, when data is updated in a cache memory, corresponding data is updated in another cache that stores the corresponding data. In a second data coherency procedure, when data is updated in one cache, the corresponding data stored in another cache is invalidated. The individual and independent storing of the coherency procedure indicator enables each cache to perform either one or the other data coherency procedure without interfering with the data coherency procedures performed by other caches in the data processing system. Furthermore, the cache that is updating data provides an updating signal on the bus, which is received by the other caches on the bus. The controllers of those caches will then either update or invalidate any corresponding data in accordance with those caches stored coherency procedure indicators.

20 Claims, 5 Drawing Sheets

CACHE CONTROLLER FOR MAINTAINING CACHE COHERENCY IN A MULTIPROCESSOR SYSTEM INCLUDING MULTIPLE DATA COHERENCY PROCEDURES

TECHNICAL FIELD

The present invention relates to a multiprocessor system wherein a plurality of processors are connected to a shared bus and a shared memory via private caches respectively. More particularly it relates to a multiprocessor system having caches, wherein a controller is provided to each cache to monitor signals on the shared bus and achieve data coherency between a plurality of caches.

BACKGROUND ART

In a multiprocessor system having a shared memory and bus, a private cache is conventionally provided to each processor to decrease conflicts of access to a bus and memory. In the present invention a mechanism is accordingly required for guaranteeing data consistency or coherency among a plurality of caches. One of such mechanisms is known as a Snoop Cache technique.

FIG. 1 shows a prior art multiprocessor system of the snoop cache type, wherein a plurality of processors 1a through 1n are connected to a shared bus 4 and a shared memory 5 via private caches 2a through 2n respectively. Controllers 3a through 3n are provided to the private caches 2a through 2n respectively to monitor signals on the shared bus 4 and to achieve data coherency in this distributed configuration. In other words, in a system of this type, the controllers 3a through 3n operate following a protocol for the shared bus 4a to attain data coherency.

Conventional protocols of prior art are divided into the invalidate type and the update type in regard to the way in which, when any of the processors 1a through 1n, writes data in a corresponding private, cache 2a through 2n, data having the same address termed corresponding or shared data, in the remaining caches 2a through 2n is manipulated. In the invalidate type protocol, data having the same address in the remaining caches 2a through 2n are all invalidated to maintain data coherency. On the other hand, in the update type protocol, all the copies in the same address are updated to the same value as the written data by any of processors 1a through 1n, and data coherency is maintained.

More specifically, an operation for guaranteeing data coherency upon a write operation for each modification type is performed as follows. Each line of each private cache is provided with one bit of information referred to as a tag, which indicates the line has data "exclusively" or "shares" it with one or more other caches. Only if data of a line of a private cache is "shared" when a related processor writes in the line of the private cache, a related controller takes the shared bus to perform a procedure for guaranteeing data coherency, and submits request signals to all the other caches to perform required operations.

FIG. 2 shows an operation in the prior art invalidate type, wherein as shown, a certain shared data in the cache 2a is subjected to a write operation, the cache 2b has the shared data, and the cache 2c does not. The requesting controller 3a of the cache 2a transmits a request signal onto the shared bus 4, and changes the tag of own shared data to "exclusive". The controller 3b of the cache 2b which has the shared data recognizes the request signal on the shared bus 4, and invalidates the shared data because it has the data of the same address. In the other cache 2c no operation is performed because it does not have the shared data.

FIG. 3 shows an operation in the prior art of the update type. In this case, the caches 2a and 2b have shared data, where the shared data in the cache 2a is subjected to a write operation. In this figure, the requesting controller 3a of the cache 2a, after submitting a request signal and update data on the shared bus, waits for a reply signal, and determines its own tag based on that reply signal. The controller 3b of the cache 2b having the shared data recognizes the request signal and updates data on the shared bus 4, and since it has data having the same address it updates the data with the update data and responds with a positive reply signal. The reply signal is next wired ORed with other like replies and then returned to the requesting controller 3a of the cache 2a. The resulting reply is used to set the data word tag.

Here the positive value represents that "the data is shared by at least one other cache", and the negative value means that "the data is never shared by any other cache". Accordingly when a positive reply signal is returned, then the requesting cache becomes "shared", otherwise it becomes "exclusive".

In general, the update type is superior to the invalidate type because the former provides a higher data hit rate. In the update type, however, bus contention occurs more frequently since it is more probable that accessed data is shared so bus access occurs more frequently during a data write operation. Consequently, which modification protocol type is more suitable cannot be determined in general; it depends on characteristics of the program to be run and operational circumstances of a particular processor. It is, accordingly, required to switch among protocol types based on different circumstances.

In order to achieve a system able to switch protocols, it may be proposed that a controller perform both the invalidate type and update type protocols, and further means is provided to switch the modification type based on the situations. In this proposal there are two problems. First, since conventional protocol types are designed for a complete system, if a modification type for each cache is switched, protocols are different from one cache to another and data coherency cannot be achieved. For example, when shared data of a first cache is subjected to a write operation, and the first cache is of the invalidate type, and a second cache having the same shared data is of the update type, then the second cache has the shared data updated while the first cache subjected to the write operation has the data tagged as exclusive (in the invalidate type any shared data subjected to a write operation is changed to exclusive). Accordingly, when the data in the first cache of the invalidate type is later subjected to a write operation, the write operation does not reflect the data in the second cache, and then data coherency between the two caches is lost. Second, if all the modification types over the system are switched simultaneously, data coherency can be maintained. However, for this purpose, when all the caches are switched simultaneously, synchronization is required over the system, prohibiting any memory access during the synchronization. Accordingly, dynamic switching cannot be practically performed at run time.

In addition, the following prior art is identified as relevant to the present invention: Preparation of More Than One Cache Memory for a System and Switch and Use of Those Caches (Japanese Published Unexamined Patent Application, JPUPA No. 51-139736, and JPUPA No. 52-80747); Switching Block Replacement Modes for a Cache Memory (JPUPA No. 51-32241, JPUPA No. 50-65141 and JPUPA No. 50-73530); and Switching Storage Modes of a Cache Memory (JPUPA No. 53-65025). However, this prior art does not suggest switching protocols for individual private caches.

In consideration of the above, it is an object of the present invention to provide a multiprocessor system wherein a modification type can be changed for each cache individually, and a modification type can be dynamically changed for each cache at run time.

DISCLOSURE OF THE INVENTION

In order to achieve the above objective, in accordance with the present invention, a function for dynamically changing a modification type for each cache is implemented by controllers and protocols. For that purpose, a concept of modification mode is introduced as an attribute for indication of a modification type of each cache. A protocol is defined which does not destroy data coherency for any combination of modification types. Controllers are provided which operate under that protocol and enable dynamic changes to modification types.

From the above, a multiprocessor system can select at any time, for each private cache, a suitable modification type, and further change modification types for each cache at any time as situations change.

BRIEF DESCRIPTION OF THE DRAWING

The foregoing and other objects, aspects and advantages of the invention will be better understood from the following best mode for carrying out the invention with reference to the figures listed below, in which.

BEST MODE FOR CARRYING OUT THE INVENTION

One embodiment of the present invention is described below in reference to FIGS. 4 and 5. It is noted that the configuration of the present embodiment is similar to the prior art configurations. The differences are mainly contained in the controller.

Figure 1:
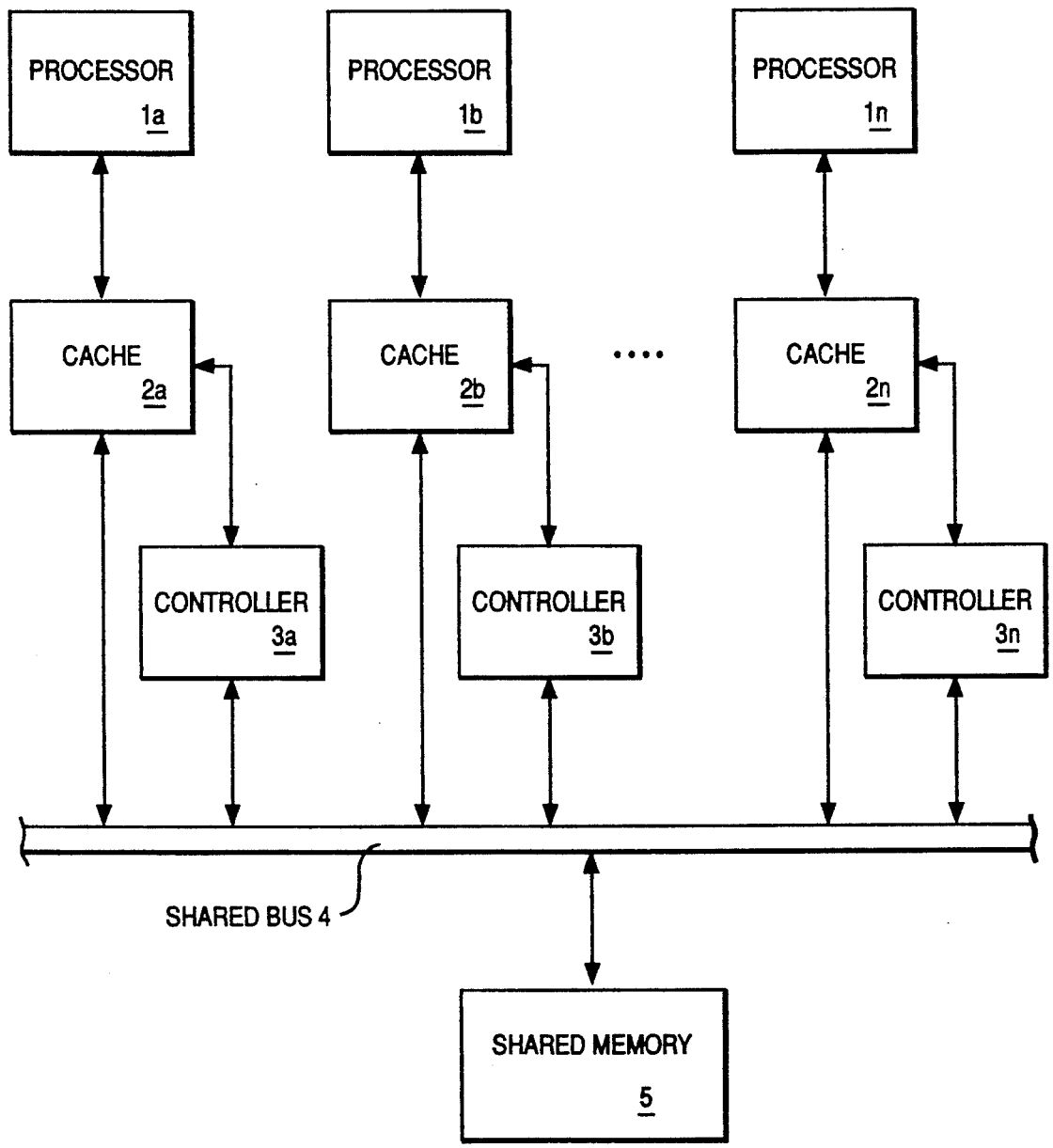
FIG. 1 is a block diagram for illustrating a conventional configuration of a multiprocessor system with a shared bus, memory and cache.
Figure 2:
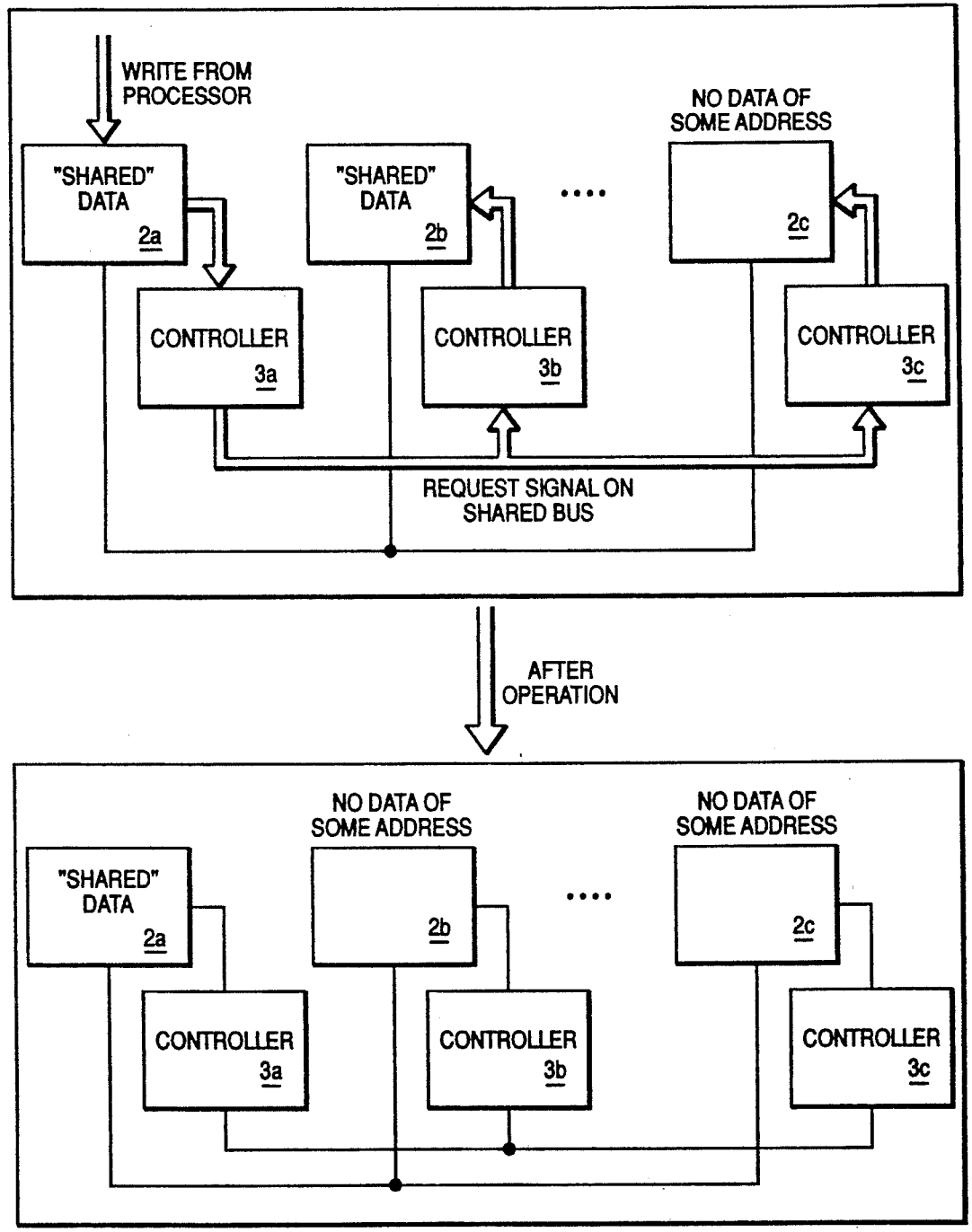
FIG. 2 is a block diagram illustrating the operation of an invalidate protocol multiprocessor system.
Figure 3:
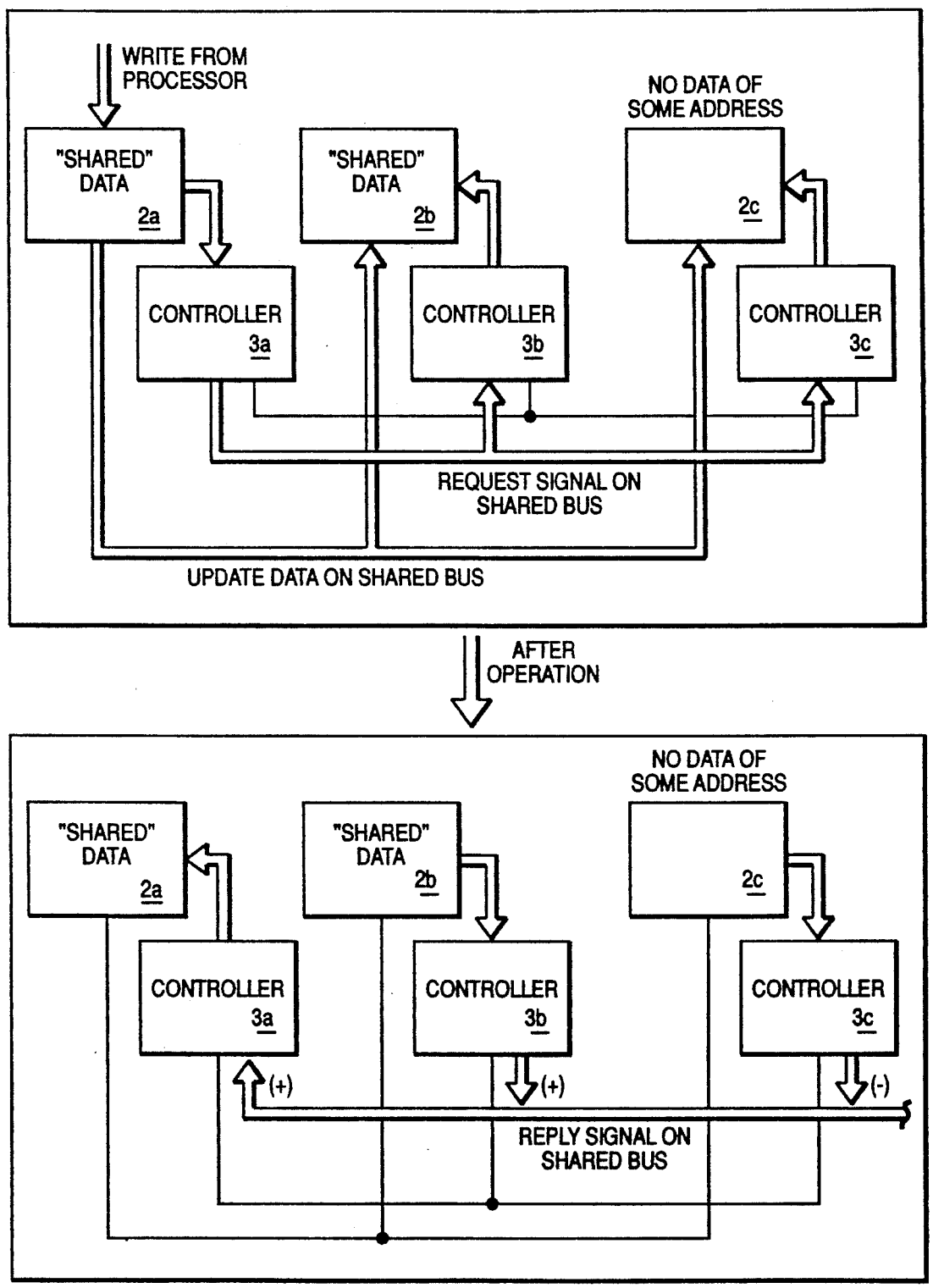
FIG. 3 is a block diagram illustrating the operation of an update protocol multiprocessor system.
Figure 4:
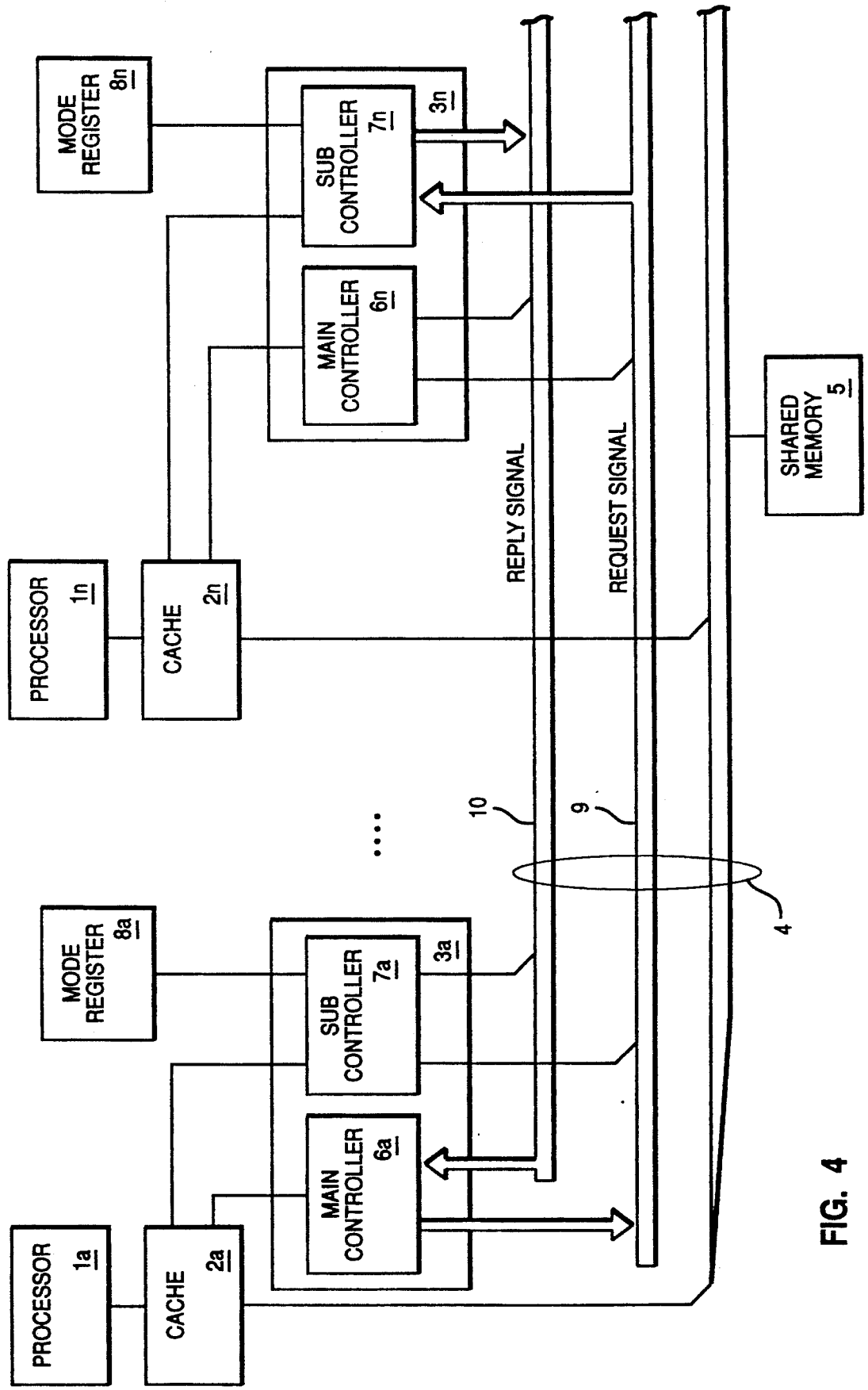
FIG. 4 is a block diagram of a multiprocessing system employing the present invention.

Referring to FIG. 4, controllers $3a$ through $3n$ consist of main controllers $6a$ through $6n$ and subcontrollers $7a$ through $7n$ respectively. An operation of each subcontroller, $7a$ through $7n$, is determined by a value of one bit in each modification mode register, $8a$ through $8n$, provided separately for each controller $3a$ through $3n$. Positive or negative values in registers $8a$ through $8n$ correspond to the invalidate and update modes respectively. In this configuration, the main controllers, $6a$ through $6n$, are connected to a request signal bus 9 of a shared bus, $7n$, are connected to a reply signal bus 10 of the shared bus. When a main controller of one controller places a request signal on the request signal bus 9, the subcontrollers of the other controllers each receive the request signal, thus placing reply signals on the reply signal bus 10. These reply signals are then ORed and returned to the main controller of the controller which placed the request signal. It should be noted that a bus arbiter (not shown) is provided so that it arbitrates the occupation of the request signal bus 9 and only one main controller can place a request signal. Because of the above configuration, it becomes possible to provide a protocol definition which was not possible before, and in which a modification type can be selected for each controller receiving the request signal.

Contents of modification mode registers $8a$ through $8n$ are, for example, set by processors $1a$ through $1n$ during initialization, and can be set again during usual operation.

Figure 5:
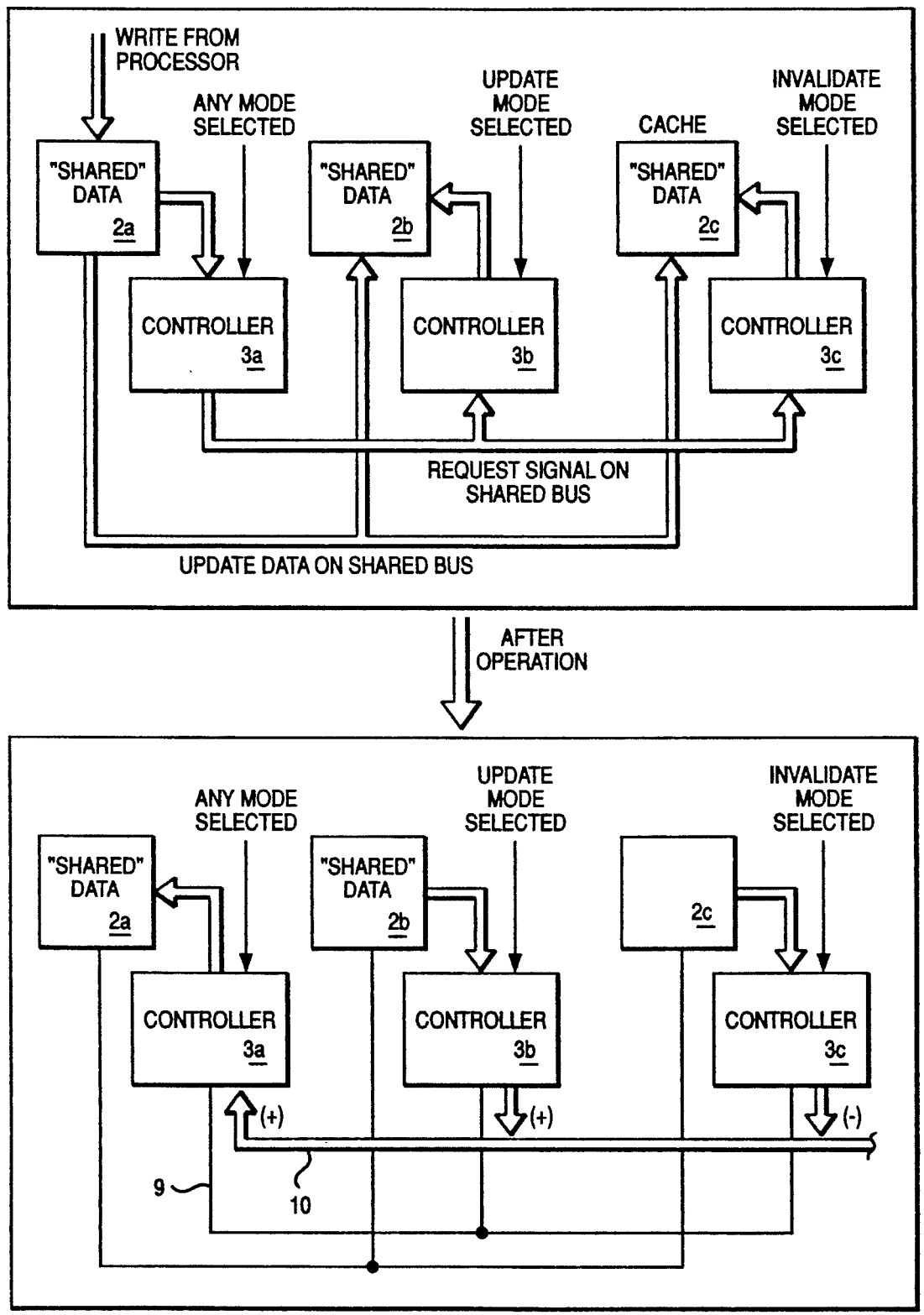
FIG. 5 is a block diagram illustrating a protocol enabling a combination of the update and invalidate protocols.

In this embodiment, the protocol is defined as shown in FIG. 5. In FIG. 5, for example, caches $2a$, $2b$ and $2c$ have certain shared data. The cache $2b$ is of the update mode, while the cache $2c$ is of the invalidate mode. The cache $2a$ may be of either type.

Referring to FIG. 5, when the processor $1a$ (not shown) writes "shared" data in the private cache $2a$, the controller of the cache $2a$ places a request signal and update data on the shared bus 4, and then waits for a reply signal. Upon receipt of the reply signal, the controller determines the tag based on the resulting signal. The controllers $3b$ and $3c$ of the other caches $2b$ and $2c$ recognize the request signal and the update data on the shared bus 4 and operate as defined by the modification mode registers, $8b$ and $8c$, respectively. In connection to the cache $2b$, the modification mode register indicates positive, which means the controller returns a negative value as a reply signal. Further if the cache $2b$ itself has data at the same address, it invalidates this data. In the example shown in this figure, the cache $2b$ has data at the same address so it invalidates the data. That is, it operates like the invalidate type while it is in the invalidate mode. On the other hand, in connection to the cache $2c$, the modification mode register $8c$ has a negative value, and, in this case, if the cache has data at the same address, the controller $3c$ updates the data with the update data and returns a positive value as a reply signal. Otherwise, the controller $3c$ performs no operations other than returning a negative value as a reply signal. According to the example shown in FIG. 5, the cache $2c$ has data at the same address. The controller $3c$ updates the data and returns a positive reply signal. That means it operates as if it was in the update mode. Hereinafter the above two modes are referred to as modification modes. The reply signals are wired ORed on the shared bus 4 and returned to the controller $3a$ of the cache $2a$, which placed the request signal. Accordingly, an ORed positive value means at least one other cache has the shared data and a negative value indicates no other cache has the shared data. Therefore, the cache $2a$ placing the request signal sets the data tag of the address to "shared" when it receives a positive reply signal and it sets the data tag to "exclusive" when it receives a negative reply signal.

According to the above protocol definition, the operation of the cache providing the request signal is not dependent upon its own modification mode and it is not directly dependent upon the modification modes of the other caches, rather it determines how to operate by recognizing the states of the data (either exclusive or shared) of the other caches solely through the reply signal. In other words, it can determine whether the data is shared or exclusive by the most primitive and direct information. On the other hand, each cache receiving a request signal determines how to operate according to its modification mode, and that mode does not affect modification modes of the other caches directly or indirectly. Each cache can adopt an individual protocol mode independently. In the above manner, the implementation shown in FIG. 4 places and receives a request signal provided by the main controller and subcontroller respectively, and the value of its modification mode register reflects on only the subcontroller state without any conflict with any other cache subcontroller state.

According to the above configuration and protocol definition, modification modes newly introduced here are different from the conventional modification types. They are not attributes for the total system but attributes for each cache independently. That is, a modification type of each cache does not affect an operation in any other cache, so that any modification mode can be selected for each cache and can operate in individual modes simultaneously without affecting data coherency in other caches. Further, in this embodiment by controlling write operations to modification mode registers and operations of subcontrollers exclusively by hardware, updating a modification mode in each cache will not destroy the data coherency of the system, and, accordingly, modification modes of each cache may be dynamically revised without necessity of synchronization of the complete system.

In the above description, only consistency among caches has been addressed. However, consistency between caches and the shared memory is also maintained. For example, when exclusive data is subjected to a write operation, then that data is applied to the shared memory after the cache has received the changed data (termed a memory swap operation). On the other hand, when shared data is subjected to a write operation, the shared memory receives the changed data at the same time as the other caches that share that data (termed a store through operation). Since swap and store through operations are well known in the art, a detailed description of them is omitted.

Further, in the above embodiment, information used to change between invalidate and update modes by modifying the contents of the controller modification registers may also provide other alternatives. For example, a requesting cache may place on the shared bus a control signal defining modification modes of other caches and replying caches operate according to the control signal. In another example, replying caches may determine how to operate according to an accessed address or an address range. It should be understood that the present invention deals with enabling a variety of modification modes to coexist and to be dynamically changed in a multiprocessor system.

As described in the above, according to the present invention, a modification mode of each cache in a multiprocessor system having a shared memory, a bus and a snoop cache configuration can be selected independently, and can be dynamically switched. As a consequence, the most suitable write access method can be used for different data processing environments, and the write access method can be switched when these data processing environments change.

Although the invention has been described with reference to this specific embodiment, this description is not meant to be construed in a limiting sense. Various modifications of the disclosed embodiment, as well as other embodiments of the invention, will become apparent to persons skilled in the art upon reference to the description of this invention. It is, therefore, contemplated that the appended claims will cover any such modifications or embodiments as fall within the true scope of the invention.

We claim:

1. A cache control system for a multiprocessor system wherein a plurality of processors are connected to a shared bus and a shared memory via a respective private caches, and when one of said private caches is subjected to a write operation for shared data which is shared by more than the one private cache, an improvement comprising:
   control means connected to each of said private caches for handling shared data being updated by said write operation, each of said control means further comprising:
   means for dynamically a modifying a data consistency maintenance procedure type while not affecting the data consistency maintenance procedure types of other caches;
   means for transmitting a request signal and an address of said write operation to control means of private caches other than the one private cache when shared data is being updated by said write operation;
   means for storing an indication about shared data in a private cache, and for changing said indication when at least one of said private caches other than said one private cache supplies in response to said request signal, a reply signal indicating that said shared data is being updated in at least one of said other private caches; and
   means of receiving said request signal and said address of said write operation from control means from said one private cache, and in response thereto, for performing a data manipulation in accordance with said indication about said shared data, and for responding to the one private cache with said reply signal indicating whether data update is performed.

2. A cache control system according to claim 1, wherein each of said control means includes means for storing information indicating the control means data consistency maintenance procedure type in a register.

3. A cache control system according to claim 1, wherein each of said control means includes means for performing, in response to a write operation address accompanying a request signal from another of said control means, a date consistency maintenance procedure according to said stored indication.

4. A cache control system according to claim 1, wherein at least one of said control means includes means for supplying information, accompanying said request signal and write operation address, indicating a type of data consistency maintenance procedure to be performed by control means other than said at least one of said control means, and wherein the control means other than said at least one of said control means includes means for performing said data consistency maintenance procedures in accordance thereto.

5. A cache control system according to claim 1, wherein data to be written is supplied in addition to a request signal and a write operation address.

6. A cache control system according to claim 1, wherein each control means includes means for, in a data consistency maintenance procedure of a first type and when shared data in one private cache is subjected to a write operation, changing the stored indication of said shared data in that one private cache to exclusive and invalidating said shared data in the other private caches and, in a data consistency maintenance procedure of a second type and when shared data in that one private cache is subjected to a write operation, if one or more other private caches have said shared data, changing the stored indication of said shared data in that one private cache to indicate that the shared data in the other private caches is updated, and if said one or more other private caches do not have said shared data, changing said stored indication of said shared data in that one private cache to be exclusive.

7. A cache control system according to claim 2, wherein data to be written is supplied in addition to a request signal and a write operation address.

8. A cache control system according to claim 2, wherein each control means includes means for, in a data consistency maintenance procedure of a first type and when shared data in one private cache is subjected to a write operation, changing the stored indication of said shared data in the private cache to exclusive and invalidating said shared data in the other private caches, and, in a data consistency maintenance procedure of a second type and when shared data in one private cache is subjected to a write operation, of one or more other processors have said shared data, changing the indication to indicate that the shred data in the other processors is updated, and if said one or more other processors do not have said shared data, changing said indication said shared data of that private cache to be exclusive.

9. A cache control system according to claim 3, wherein data to be written is supplied in addition to a request signal and a write operation address.

10. A cache control system according to claim 3, wherein each control means includes means for, in a data consistency maintenance procedure of a first step and when shared data in one private cache is subjected to a write operation, changing the stored indication of said shared data in that private cache to exclusive and invalidating said shared data int the other private caches, and, in a data consistency maintenance procedure of a second type and when a shared data in one private cache is subjected to a write operation, if one or more other processors have said shared data, changing the indication to indicate that the shared data in the other processors is updated, and if said one or more other processors do not have said shared data, changing said indication said shared data of that private cache to be exclusive.

11. A cache control system according to claim 4, wherein data to be written is supplied in addition to a request signal and a write operation address.

12. A cache system control according to claim 4, wherein each control means includes mans for, in a data consistency maintenance procedure of a first type and when shared data in one private cache is subjected to a write operation, changing the stored indication of said shared data in that private cache to exclusive and invalidating said shared data in the other private caches, and, in a data consistency maintenance procedure of a second type and when a shared data in one private cache is subjected to a write operation, if one or more other processors have said shared data, changing the indication to indicate that the shared data in the other processors is updated, and if said one or more other processors do no have said shared data, changing said indication of said shared data that private cache to be exclusive.

13. A cache control system for a multiprocessor system wherein a plurality of processors are connected to a shared bus and a shared memory via respective private caches, and when a first of said private caches is subjected to a write operation about shared data which is shared by more than one private cache in addition to the first private cache, a first data consistency maintenance procedure and a second data consistency maintenance procedure being performed for resolving discrepancy of said shared data among the involved private caches wherein the cache control system is initialized to perform said first data consistency maintenance procedure, an improvement characterized by:
 means for changing to the second data consistency maintenance procedure dynamically in at least one of a first plurality of private caches while at least one of a second plurality of private caches maintains said fist data consistency maintenance procedure.

14. A cache control method for a multiprocessor system wherein a plurality of processors are connected to a shared bus and is shared memory via respective private caches, and when a first of said private caches is subjected to a write operation for shared data which is shared by more that one private cache in addition to the first private cache, one of said data consistency maintenance procedures being performed for resolving discrepancy of said shared data among the private caches sharing the shared data and when as shared data of one of said private caches is subjected to a write operation an improved method comprising the steps of:
 transmitting from said first of private caches a request signal for requesting one of aid data consistency maintenance procedures to be performed;
 in each of other private caches having said shared data, invalidating said shared data if said cache is of a first type and updating said shared data s in said one of private cache in accordance with said request signal if said cache is of a second type; and
 keeping a state indication of said shared data in said one of private caches when a received reply signal from at least one of other private caches indicates that an update operation has been performed in other private caches, or otherwise changing said state indication of said shared data in said one of private caches to exclusive when all of said received reply signals indicate that update operations have not between performed in other private caches.

15. A data processing system comprising:
 a plurality of processors;
 at least one of said plurality of processors connected individually to a cache memory for storing data;
 each cache memory having a cache controller, each controller connected to a bus; and
 each controller inclusion means for independently storing a data coherency procedure indicator indicating one of at least two data coherency procedures, each indicator capable of being modified dynamically without affecting other indicators, and, in accordance with the a stored data coherency procedure indicator, updating data when corresponding data is updated in another cache if the stored data coherency procedure indicator is of a fist type and invalidating data when corresponding data is updated in another cache if the stored data coherency procedure indicator is of a second type.

16. A data processing system of claim 15 wherein a data coherency procedure performed according to said stored data coherency procedure indicator is performed independently of indicator stored n other cache controllers.

17. A data processing system of claim 16 wherein each cache controller transmits a signal over said bus when a cache memory data is updated and a controller's cache memory.

18. A data processing system of claim 17 wherein each cache controller includes means for receiving a transmitted signal and for transmitting a reply signal when a receiving controller has stored data corresponding to said updated data and wherein said reply signal indicated that, in accordance with the cache controler's stored coherency procedure indicator, either (1) the corresponding data has been updated or (2) the corresponding data has been invalidated.

19. A data processing system of claim 18 wherein each cache controller includes means for receiving said reply signal, and, in response thereto, setting a data tag of the updated data to indicate shared data when at least one other cache controller reply signal indicates that corresponding data has been updated or setting the data tag of the updated data to indicate exclusive data when no other controller reply signal indicates that and corresponding data has been updated.

20. A data processing system of claim 15 further including a memory connected to said bus, said memory including means for updating corresponding data stored therein in response to the updating of data by a cache controller.

* * * * *

UNITED STATES PATENT AND TRADEMARK OFFICE
CERTIFICATE OF CORRECTION

PATENT NO. : 5,226,144

DATED : July 6, 1993

INVENTOR(S) : Atsushi Moriwaki and Shigenori Shimizu

It is certified that error appears in the above-indentified patent and that said Letters Patent is hereby corrected as shown below:

Col. 6, line 25, delete "a", first occurrence;
      line 57, delete "date" and insert --data--;
Col. 7, line 35, delete "shred" and insert --shared--;
      line 44, delete "step" and insert --type--;
      line 48, delete "int" and insert --in--;
      line 62, delete "mans" and insert --means--;
Col. 8, line 6, delete "no" and insert --not--;
      line 25, delete "fist" and insert --first--;
      line 33, delete "said" and insert --two--;
      line 40, delete "aid" and insert --said--;
      line 44, delete "s" and insert --as--;
      line 55, delete "between" and insert --been--;
      line 63, delete "inclusion" and insert --including--;
Col. 9, line 11, delete "n" and insert --in--;
Col. 10, line 2, delete "indicated" and insert --indicates--;
      line 8, after "signal" delete ",";

UNITED STATES PATENT AND TRADEMARK OFFICE
CERTIFICATE OF CORRECTION

PATENT NO. : 5,226,144
DATED : July 6, 1993
INVENTOR(S) : Atsushi Moriwaki, et al It is certified that error appears in the above-indentified patent and that said Letters Patent is hereby corrected as shown below:

Column 10, line 9, delete "of" and insert --for--; and
line 13, delete "and" and insert --any--.

Signed and Sealed this

Twenty-eighth Day of May, 1996

BRUCE LEHMAN

Attest:

Attesting Officer

Commissioner of Patents and Trademarks